United States Patent
Kim et al.

(10) Patent No.: US 12,469,322 B2
(45) Date of Patent: *Nov. 11, 2025

(54) METHODS AND SYSTEMS FOR TRANSFER LEARNING OF DEEP LEARNING MODEL BASED ON DOCUMENT SIMILARITY LEARNING

(71) Applicant: NAVER CORPORATION, Seongnam-si (KR)

(72) Inventors: Sung Min Kim, Seongnam-si (KR); Kyoungho Choi, Seongnam-si (KR); Kyuho Lee, Seongnam-si (KR)

(73) Assignee: NAVER CORPORATION, Gyeonggi-Do (KR)

( * ) Notice: Subject to any disclaimer, the term of this patent is extended or adjusted under 35 U.S.C. 154(b) by 1105 days.

This patent is subject to a terminal disclaimer.

(21) Appl. No.: 17/355,406

(22) Filed: Jun. 23, 2021

(65) Prior Publication Data
US 2022/0230014 A1 Jul. 21, 2022

(30) Foreign Application Priority Data
Jan. 19, 2021 (KR) .................... 10-2021-0007453

(51) Int. Cl.
*G06V 30/418* (2022.01)
*G06F 18/21* (2023.01)
(Continued)

(52) U.S. Cl.
CPC ........ *G06V 30/418* (2022.01); *G06F 18/2148* (2023.01); *G06F 18/2193* (2023.01);
(Continued)

(58) Field of Classification Search
CPC ............... G06V 30/418; G06V 30/416; G06F 18/2148; G06F 18/2193; G06F 18/22;
(Continued)

(56) References Cited

U.S. PATENT DOCUMENTS

2006/0294101 A1* 12/2006 Wnek ..................... G06F 16/93
2011/0055332 A1* 3/2011 Stein .................... G06Q 10/107
382/218

(Continued)

FOREIGN PATENT DOCUMENTS

KR  10-2020-0048474 A  5/2020
KR     102179086 B1 * 11/2020 ............... G06N 3/08

OTHER PUBLICATIONS

Wazirali, R. An Improved Intrusion Detection System Based on KNN Hyperparameter Tuning and Cross-Validation. Arab J Sci Eng 45, 10859-10873 (2020). https://doi.org/10.1007/s13369-020-04907-7 (Year: 2020).*

(Continued)

*Primary Examiner* — James T Tsai
(74) *Attorney, Agent, or Firm* — Harness, Dickey & Pierce, P.L.C.

(57) ABSTRACT

Disclosed is a method and system for transfer learning of a deep learning model based on a document similarity learning. A transfer learning method may include pre-training, by the at least one processor, a similarity model to output a similarity between documents, generating, by the at least one processor, a fine tuning model by replacing a first output function of the pre-trained similarity model with a second output function, and training, by the at least one processor, the fine tuning model to output a score for a document input to the fine tuning model.

18 Claims, 7 Drawing Sheets

(51) Int. Cl.
  G06F 18/214 (2023.01)
  G06F 18/22 (2023.01)
  G06F 18/2415 (2023.01)
  G06F 40/30 (2020.01)
  G06N 3/096 (2023.01)
  G06V 30/416 (2022.01)
(52) U.S. Cl.
  CPC .......... *G06F 18/22* (2023.01); *G06F 18/2415* (2023.01); *G06F 40/30* (2020.01); *G06N 3/096* (2023.01); *G06V 30/416* (2022.01)
(58) Field of Classification Search
  CPC ...... G06F 18/2415; G06F 40/30; G06F 17/16; G06F 17/18; G06N 3/08; G06N 3/096; G06N 7/01
  See application file for complete search history.

(56) References Cited

U.S. PATENT DOCUMENTS

| | | | | |
|---|---|---|---|---|
| 2011/0087668 | A1* | 4/2011 | Thomas | G06F 16/35 707/738 |
| 2012/0323968 | A1* | 12/2012 | Yih | G06F 16/31 707/E17.069 |
| 2021/0141897 | A1* | 5/2021 | Seifert | G06F 40/30 |
| 2021/0295148 | A1* | 9/2021 | Gonsalves | G06N 3/045 |
| 2021/0334908 | A1* | 10/2021 | Shu | G06Q 50/01 |
| 2022/0405504 | A1* | 12/2022 | Malkiel | G06V 30/418 |
| 2023/0245650 | A1* | 8/2023 | Cary | G10L 25/54 704/9 |

OTHER PUBLICATIONS

Baccouche, A., Ahmed, S., Sierra-Sosa, D., & Elmaghraby, A. (2020). Malicious Text Identification: Deep Learning from Public Comments and Emails. Information, 11(6), 312. https://doi.org/10.3390/info11060312 (Year: 2020).*

Blog post entitled "AI cleanbot filters out rude expressions through upgrades," uploaded on Jun. 19, 2020 by user "Diary for men and women" *Naver Diary*. [online], [retrieved on Jun. 2, 2021]. Retrieved from the Internet <URL: <https://m.blog.naver.com/PostView.nhnblogId=naver_diary&logNo=222005616849&searchKeyword=%ED%81%B4%EB%A6%B0%EB%B4%87>.

Choi, I. [Tech & BIZ] AI that detects derogatory speech in context and finds bad comments without profanity *Chosun Ilbo*, (Jun. 25, 2020) [online], [retrieved on Jun. 2, 2021]. Retrieved from the Internet <URL: https://www.chosun.com/site/data/html_dir/2020/06/25/2020062500399.html?utm_source=naver&utm_medium=original&utm_campaign=news>.

Blog post entitled "Cleanbot 2.0: AI for detecting malicious comments (short sentences) that understands context," uploaded on Jul. 17, 2020 by users "Lee, K. et al." *Naver D2 Blog*. [online], [retrieved on Jun. 2, 2021]. Retrieved from the Internet <URL:https://d2.naver.com/helloworld/7753273>.

Lee, D. "[Naver Avengers] A record-breaking emergency of bad comments . . . The landscape that has changed since the appearance of Clean Bot" Ddaily, (Jul. 29, 2020) [online], [retrieved on Jun. 2, 2021]. Retrieved from the Internet <URL: <http://www.ddaily.co.kr/news/article/?no=199168>.

Park, D. [Anyway, weekend] Hundreds of thousands of bad comments a day . . . Comments The cleaners are busy *Chosun Ilbo*, (Sep. 12, 2020) [online], [retrieved on Jun. 2, 2021]. Retrieved from the Internet <URL: https://www.chosun.com/national/weekend/2020/09/12/O4KDLLNBNNFYRKFPZHMXZNSLM4/?utm_source=naver&utm_medium=original&utm_campaign=news>.

Park, D. "Catch the bad comments" Cleanbot never stops *Naver News*, (Oct. 2, 2020) [online], [retrieved on Jun. 2, 2021]. Retrieved from the Internet <URL: https://www.chosun.com/national/weekend/2020/10/02/GHURT3TV3JDJDHEHOZJ54DUEE4/?utm_source=naver&utm_medium=original&utm_campaign=news>.

Ahn, H. "I changed my twin bath and erased it . . . AI, evil comments evolving every other 100 million cases a month" *The Hankook Ilbo: Balance to see the world*, (May 6, 2021) [online], [retrieved on Jun. 2, 2021]. Retrieved from the Internet <URL: https://news.naver.com/main/read.nhn?mode=LSD&mid=sec&sid1=105&oid=469&aid=0000542197>.

Kwak, J. "There are a lot of Korean variations, it's hard to filter out swear words . . . If AI develops, you may open the comment window again." *The Hankook Ilbo: Balance to see the world*, (Oct. 8, 2020) [online], [retrieved on Jun. 2, 2021]. Retrieved from the Internet <URL: <https://news.naver.com/main/read.nhn?mode=LSD&mid=sec&sid1=102&oid=023&aid=0003565876>https://www.hankookilbo.com/News/Read/A2020100709440004131?did=NA>.

Japanese Office Action issued on Aug. 30, 2020 by the Japanese Patent Office corresponding to Japanese patent application No. 2021-097090.

Kazuya Uno, "Introduction to natural language processing, Verification of Similar Sentence Retrieval by Sentence BERT". Advanced Technology Center, Technology Department, OGIS Research Institute, Jun. 23, 2020, https://www.ogis-ri.co.jp/otc/hiroba/technical/similar-document-search/part9.html.

"Understanding Sentence—BERT", Aug. 4, 2020, https://data-analytics.fun/2020/08/04/understanding-sentence-bert.

Koutarou Tamura et al., "Knowledge reasoning of detective novels by abduction, SAT problem and BERT model", The 34th Annual Conference of the Japanese Society for Artificial Intelligence, Jun. 9, 2020, https://www.jstage.jst.go.jp/article/pjsai/JSAI2020/0/JSAI2020_1O4GS402/_pdf/-char/ja.

Korean Office Action dated Dec. 18, 2022 for corresponding Korean patent application No. 10-2021-0007453.

Lee, H et al. "Study on the Toxic Comments Classification Using CNN Modeling with Highway Network and OOV Process," 2020. http://dx.doi.org/10.5859/KAIS.2020.29.3.103.

Min, J et al. "Korean Machine Reading Comprehension for Patent Consultation using BERT," 2019. *Korea Institute of Patent Information*.

* cited by examiner

METHODS AND SYSTEMS FOR TRANSFER LEARNING OF DEEP LEARNING MODEL BASED ON DOCUMENT SIMILARITY LEARNING

CROSS-REFERENCE TO RELATED APPLICATION(S)

This U.S. non-provisional application claims the benefit of priority under 35 U.S.C. § 119 to Korean Patent Application No. 10-2021-0007453, filed Jan. 19, 2021, the entire contents of which are incorporated herein by reference in their entirety.

TECHNICAL FIELD

Some example embodiments relate to a method and system for transfer learning of a deep learning model based on a document similarity learning.

RELATED ART

In the case of building a machine learning model, the quantity and quality of learning data may be factors that greatly affect the quality of the machine learning model. A learning model based on a large amount of data that is not biased, and has no abnormal value and no missing value, is highly likely to exhibit excellent performance. However, learning data may be insufficient in some fields. Such a lack of learning data may inevitably lead to an incomplete model. To overcome such limitations, a study on a learning method itself, that is, a study on meta learning is also being actively conducted. If a high quality of data sufficient to be used for learning is not secured, a method of building a model by reusing some layers from a model with excellent performance based on abundant data in different fields may be considered. This learning method is a transfer learning.

In general, transfer learning methodology for improving performance of a document classification model performs language modeling for estimating an ungiven token in a state in which only a portion of a sentence is given as an input, a multi-tasking learning for training a single model to simultaneously or contemporaneously learn different but relevant classification challenges, and a task of determining whether given two sentences are two consecutive sentences. A similarity learning method using data in which a similarity between two sentences is calculated by a person is also being used.

A common limitation found in related arts is that, although whether specific attributes of two documents included in a document set to be classified match has an important meaning, it may not be appropriately used. Language modeling methodology has a disadvantage in that the computational cost of a model significantly increases in proportion to a number of tokens that constitute a sentence. Multitask learning methodology involves document sets labeled as many as a number of tasks. Determination of whether two documents are consecutive documents may not be readily applied when each document in each document set includes short sentences or is a type that is not easy for sentence separation.

SUMMARY

Some example embodiments provide a new pre-training method for transfer learning and a procedure for continuing the same to a fine tuning process.

According to an aspect of some example embodiments, there is provided a transfer learning method of a computer apparatus including at least one processor, the transfer learning method including pre-training, by the at least one processor, a similarity model to output a similarity between documents, generating, by the at least one processor, a fine tuning model by replacing a first output function of the pre-trained similarity model with a second output function, and training, by the at least one processor, the fine tuning model to output a score for a document input to the fine tuning model.

The first output function may include an operation of multiplying a matrix with a size of N×M, the second output function may include an operation of multiplying a matrix with a size of K×M, and each of N, M, and K may denote a natural number.

The fine tuning model may be a K-binary classification model, the score may be a probability value for each of K items corresponding to the document, and K may denote a natural number.

The training of the fine tuning model may include training the fine tuning model to output the score that minimizes a cross entropy error (CEE) between a corresponding score of the document and a correct answer label.

The correct answer label may include a value representing whether the document is a malicious comment, the fine tuning model is a malicious comment detection model, and the score represents whether the document is a malicious comment.

The pre-training may include extracting, by the at least one processor, a similar document pair set and a dissimilar document pair set from a document database, the similar document pair set including a plurality of similar document pairs having a common attribute, and the dissimilar document pair set including a plurality of dissimilar document pairs extracted randomly, acquiring, by the at least one processor, a semantic similarity for each of the plurality of similar document pairs and each of the plurality of dissimilar document pairs, and training, by the at least one processor, the similarity model using the plurality of similar document pairs, the plurality of dissimilar document pairs, and the semantic similarity.

The acquiring of the semantic similarity may include calculating, by the at least one processor, a mathematical similarity for each of the plurality of similar document pairs and each of the plurality of dissimilar document pairs using a mathematical scale to obtain a first plurality of mathematical similarities based on the plurality of similar document pairs and a second plurality of mathematical similarities based on the plurality of dissimilar document pairs, and calculating, by the at least one processor, the semantic similarity for each of the plurality of similar document pairs and each of the plurality of dissimilar document pairs to obtain a first plurality of semantic similarities based on the plurality of similar document pairs and a second plurality of semantic similarities based on the plurality of dissimilar document pairs, each of the first plurality of semantic similarities being higher than a corresponding one of the first plurality of mathematical similarities, and each of the second plurality of semantic similarities being lower than a corresponding one of the second plurality of mathematical similarities. The training the similarity model may include training the similarity model using the plurality of similar document pairs, the plurality of dissimilar document pairs, the first plurality of semantic similarities and the second plurality of semantic similarities.

The calculating of the semantic similarity may include calculating the first plurality of semantic similarities by inputting the first plurality of mathematical similarities to a first nonlinear function, and calculating the second plurality of sematic similarities by inputting the second plurality of mathematical similarities to a second nonlinear function. The first nonlinear function may output a higher value than a value output by the second nonlinear function based on any value input to both the first nonlinear function and the second nonlinear function The common attribute may include at least one of an author of a respective document, a posting section of the respective document, or a registration time range of the respective document.

According to an aspect of some example embodiments, there is provided a non-transitory computer-readable record medium storing instructions that, when executed by at least one processor, cause the at least one processor to perform the transfer learning method.

According to an aspect of some example embodiments, there is provided a computer apparatus including at least one processor configured to execute computer-readable instructions. The at least one processor is configured to cause the computer apparatus to pre-train a similarity model to output a similarity between documents, generate a fine tuning model by replacing a first output function of the pre-trained similarity model with a second output function, and train the fine tuning model to output a score for a document input to the fine tuning model.

The transfer learning method may include obtaining, by the at least one processor, another score of another document input to the trained fine tuning model, and blocking, by the at least one processor, registration of the another document based on the another score.

According to some example embodiments, it is possible to use semantic attributes of the respective documents included in a document set to be classified for a transfer learning process.

Further areas of applicability will become apparent from the description provided herein. The description and specific examples in this summary are intended for purposes of illustration only and are not intended to limit the scope of the present disclosure.

DETAILED DESCRIPTION

Figure 1:
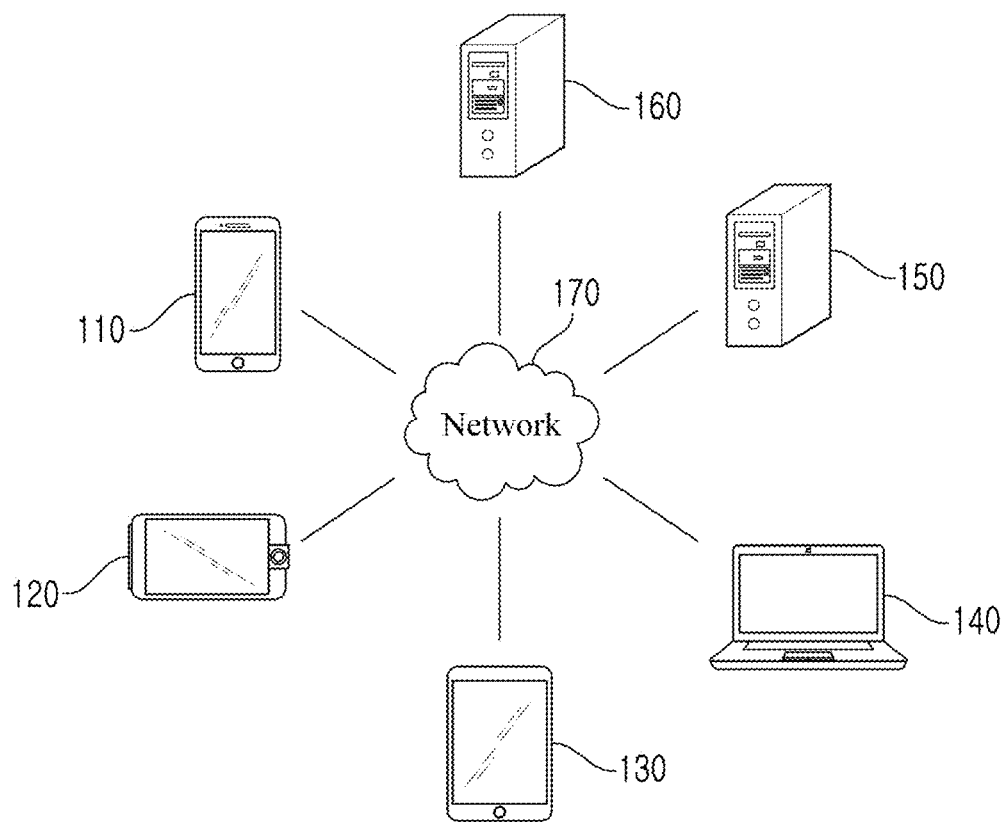
FIG. 1 is a diagram illustrating an example of a network environment according to some example embodiments.

Some example embodiments will be described in detail with reference to the accompanying drawings. Some example embodiments, however, may be embodied in various different forms, and should not be construed as being limited to only the illustrated examples. Rather, the illustrated examples are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, operations, elements, and/or components, but do not preclude the presence or addition of one or more other features, integers, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as, or a similar meaning to, that commonly understood by one of ordinary skill in the art to which some example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned herein. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, some example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of some example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, some example embodiments will be described with reference to the accompanying drawings.

A transfer learning system according to some example embodiments may be implemented by at least one computer apparatus and a transfer learning method according to some example embodiments may be performed through at least one computer apparatus included in the transfer learning system. A computer program may be installed and executed on the computer apparatus and the computer apparatus may perform the transfer learning method according to some example embodiments under control of the executed computer program. The aforementioned computer program may be stored in a non-transitory computer-readable record medium to computer-implement the transfer learning method in conjunction with the computer apparatus.

FIG. 1 illustrates an example of a network environment according to some example embodiments. Referring to FIG. 1, the network environment may include a plurality of electronic devices 110, 120, 130, and/or 140, a plurality of servers 150 and 160, and/or a network 170. FIG. 1 is provided as an example only. A number of electronic devices or a number of servers is not limited thereto. Also, the network environment of FIG. 1 is provided as an example of environments applicable to some example embodiments and the environment applicable to some example embodiments is not limited to the network environment of FIG. 1.

Each of the plurality of electronic devices 110, 120, 130, and/or 140 may be a fixed terminal or a mobile terminal that is configured as a computer apparatus. For example, the plurality of electronic devices 110, 120, 130, and/or 140 may be a smartphone, a mobile phone, a navigation device, a computer, a laptop computer, a digital broadcasting terminal, a personal digital assistant (PDA), a portable multimedia player (PMP), a tablet personal computer (PC), and/or the like. For example, although FIG. 1 illustrates a shape of a smartphone as an example of the electronic device 110, the electronic device 110 used herein may refer to one of various types of physical computer apparatuses capable of communicating with other electronic devices 120, 130, and/or 140, and/or the servers 150 and 160, over the network 170 in a wireless and/or wired communication manner.

The communication scheme is not limited and may include a near field wireless communication scheme between devices as well as a communication scheme using a communication network (e.g., a mobile communication network, wired Internet, wireless Internet, a broadcasting network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and/or the Internet. Also, the network 170 may include at least one of network topologies that include a bus network, a star network, a ring network, a mesh network, a star-bus network, a tree or hierarchical network, and/or the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and/or 140 over the network 170. For example, the server 150 may be a system that provides a service to the plurality of electronic devices 110, 120, 130, and/or 140 connected over the network 170. For example, the service may include a content providing service, a group call service or a voice conference service, a messaging service, a mail service, a social network service, a map service, a translation service, a financial service, a payment service, and/or a search service.

Figure 2:
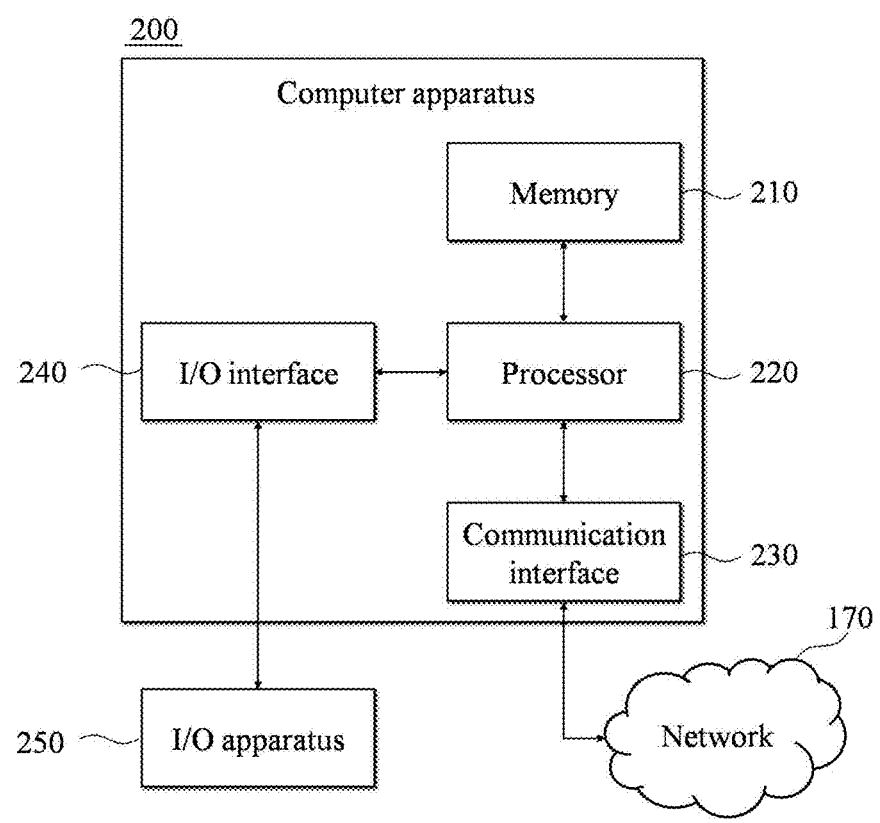
FIG. 2 is a diagram illustrating an example of a computer apparatus according to some example embodiments.

FIG. 2 is a block diagram illustrating an example of a computer apparatus according to some example embodiments. Each of the plurality of electronic devices 110, 120, 130, and/or 140, and/or the servers 150 and/or 160, may be implemented in a computer apparatus 200 of FIG. 2.

Referring to FIG. 2, the computer apparatus 200 may include a memory 210, a processor 220, a communication interface 230, and/or an input/output (I/O) interface 240. The memory 210 may include a permanent mass storage device, such as a random access memory (RAM), a read only memory (ROM), and/or a disk drive, as a non-transitory computer-readable record medium. The permanent mass storage device, such as the ROM and disk drive, may be included in the computer apparatus 200 as a permanent storage device separate from the memory 210. Also, an OS and at least one program code may be stored in the memory 210. Such software components may be loaded to the memory 210 from another non-transitory computer-readable record medium separate from the memory 210. The other non-transitory computer-readable record medium may include, for example, a floppy drive, a disk, a tape, a DVD/CD-ROM drive, a memory card, etc. According to some example embodiments, software components may be loaded to the memory 210 through the communication interface 230, instead of the non-transitory computer-readable record medium. For example, the software components may be loaded to the memory 210 based on a computer program installed by files provided over the network 170.

The processor 220 may be configured to process instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to the program code stored in the storage device, such as the memory 210.

The communication interface 230 may provide a function for communication between the computer apparatus 200 and other apparatuses, for example, the aforementioned storage devices, over the network 170. For example, the processor 220 of the computer apparatus 200 may transfer a request created based on a program code stored in the storage device such as the memory 210, to the other apparatuses over the network 170 under control of the communication interface 230. Inversely, a signal, an instruction, data, a file, etc., from another apparatus may be received at the computer apparatus 200 through the communication interface 230 of the computer apparatus 200. For example, a signal, an instruction, data, etc., received through the communication interface 230 may be transferred to the processor 220 or the memory 210, and a file, etc., may be stored in a storage medium, for example, the permanent storage device, further includable in the computer apparatus 200.

The I/O interface 240 may be a device used for interface with an I/O apparatus 250 (e.g., an input device and/or an output device). For example, an input device may include a device, such as a microphone, a keyboard, a mouse, etc., and an output device may include a device, such as a display, a speaker, etc. As another example, the I/O interface 240 may be a device for interface with an apparatus in which an input function and an output function are integrated into a single function, such as a touchscreen. The I/O apparatus 250 may be configured as a single device with the computer apparatus 200.

According to some example embodiments, the computer apparatus 200 may include a number of components greater than or less than a number of components shown in FIG. 2. However, some components according to the related art are not illustrated in detail. For example, the computer apparatus 200 may include at least a portion of the I/O apparatus 250, or may further include other components, for example, a transceiver, a database (DB), and/or the like.

The term "document" used in some example embodiments may include a posting uploaded on the web (e.g., the Internet) by an author, such as a blog listing, a news article, a comment, and/or the like. Also, the term "attribute" refers to a feature predefined or alternatively, given for a document, and may be determined based on, for example, at least one of an author of the document, a posting section of the document, and/or a registration time range of the document. The posting section of the document may be based on sections in which documents are exposed in a single service. For example, that two documents are posted on the same section, or similar sections, may represent that posting sections of the two documents are identical or similar among a plurality of posting sections in which documents are exposed in a single service. For example, as sections for posting a document to a specific blog, a posting section for "movie", a posting section for "music", and a posting section for "book" may be included. The posting sections of documents may be variously set for each service to which the document is posted. When an author is defined as an attribute, two different blog listings of the same author, or similar authors, may be recognized as documents of the same attributes or similar attributes. As another example, when an author, a posting section, and a 1-hour range are defined as attributes, two comments registered within one hour (e.g., within one hour of each other) in the same posting section, or similar posting sections, by the same author or similar authors, may be recognized as documents having the same attributes or similar attributes. Also, the term "duplicate" between documents may represent that the two documents have a similarity of a threshold or more. For example, if a semantic similarity value between document 1 and document 2 is 0.97, with the assumption that a similarity value between documents is represented in the range of 0.00 to 1.00 and a threshold for "duplicate" is assumed as 0.95, document 1 and document 2 may be determined as duplicate documents. That is, although contents of the two documents are not completely identical, documents including certain or more similar contents (e.g., a certain amount of similar content or more) may be determined as duplicate documents. According to some example embodiments, the threshold for "duplicate" may be determined through empirical study Initially, to construct data for use in pre-training, a pair that includes two documents may be extracted from a database that stores a plurality of documents using an extraction method. Among extracted document pairs, if two documents included in a pair have the same value or similar values for a specific attribute, the corresponding pair may be referred to as a similar document pair. Otherwise, the corresponding pair may be referred to as a dissimilar document pair. A target similarity may be assigned by applying a consistent rule such that similar document pairs may have an overall high similarity and dissimilar document pairs may have an overall low similarity. Pre-training may be performed to minimize or reduce an error (e.g., an amount of error) between a value calculated by receiving (e.g., receiving and processing), by a model configured to perform a transfer learning process, document pairs and a target similarity assigned to each document pair.

Fine tuning may be performed for document classification learning that is originally aimed using a model that has completed a pre-training process.

Hereinafter, a data construction process for transfer learning is further described.

When two documents have a common value for a specific attribute among document attributes in a database that stores a plurality of documents, whether a semantic correlation is present between contents of the two documents may be determined. When such an attribute is determined, a plurality of document pairs each including two documents having the common attribute may be extracted from the database and may be referred to as similar document pairs. On the contrary, a plurality of document pairs each including two documents having different attributes may be extracted from the database and may be referred to as dissimilar document pairs. Subsequently, two appropriate functions may be devised: One function is called a similarity upward function that is designed to properly increase a real value, for example, between 0 and 1 within a similarity definition range. Another function is called a similarity downward function that is designed to properly decrease a real value of the same range, or similar range, within the corresponding similarity definition range. With respect to all the collected document pairs, a similarity between two documents constituting each single pair may be calculated using a typical document similarity measurement method. With respect to a similar document pair, a value acquired by applying the similarity upward function to a similarity value calculated using the typical document similarity measurement method may be regarded as a target similarity of a corresponding similar document pair. With respect to a dissimilar document pair, a value acquired by applying the similarity downward function to a similarity value calculated using the same document similarity measurement method, or a similar document similarity measurement method, may be regarded as a target similarity of a corresponding dissimilar document pair.

Hereinafter, a process of performing pre-training using learning data constructed as above may be performed as follows:

Initially, a model to be pre-trained may be configured in a form capable of receiving two documents and calculating a single real value. To perform the aforementioned operation, the model may be configured to calculate a vector representation for a single document, each of two documents may be abstracted as a vector representation using the same model or similar models, and a similarity may be calculated through an appropriate operation between two vector representations. For example, there may be a method of calculating a cosine similarity between vectors of two documents. When the model calculates a similarity of each document pair on learning data under this operation structure, the model may be trained to minimize, or reduce, an error between the calculated similarity and a target similarity assigned to the corresponding document pair.

Figure 3:
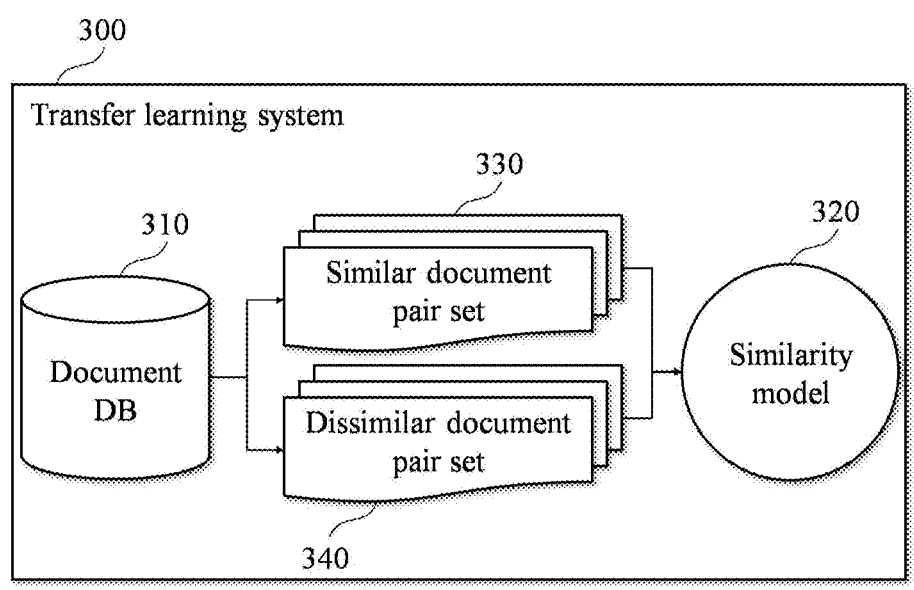
FIG. 3 illustrates an example of a transfer learning system for pre-training according to some example embodiments.

FIG. 3 illustrates an example of a transfer learning system for pre-training according to some example embodiments. A transfer learning system 300 according to some example embodiments may be implemented by the aforementioned computer apparatus 200 (e.g., the processor 220). A learning process of a similarity model for pre-training may be processed under control of the processor 220 included in the computer apparatus 200.

The transfer learning system 300 may train a similarity model 320 to minimize, or reduce, an error between a similarity between documents included in a document database (DB) 310 and a target similarity (or a correct answer similarity) assigned between the corresponding documents.

The document DB 310 may be included in a physical device (a first device, e.g., the server 150) that implements the transfer learning system 300 and configured to provide documents. Also, the document DB 310 may be implemented in a physical device (a second device, e.g., the server 160) outside the transfer learning system 300 and configured to provide documents in a form in which the first device and the second device communicate through the network 170.

The transfer learning system 300 may extract a similar document pair set 330 and a dissimilar document pair set 340 from the document DB 310. The similar document pair set 330 may represent a set of document pairs each having the same predefined (or alternatively given) attribute or similar predefined (or alternatively given) attributes (e.g., an attribute common to the pair and/or set of documents and having the same or similar values in the pair and/or set of documents, may also be referred to herein as a common attribute). The dissimilar document pair set 340 may represent a set of document pairs arbitrarily (e.g., randomly) extracted without considering an attribute. Depending on some example embodiments, the dissimilar document pair set 340 may represent a set of document pairs each having different predefined or alternatively, given attributes (e.g., an attribute common to the pair and/or set of documents that has different values in the set of documents).

In one experimental example, "35 million document pairs created by the same author within one hour in the same posting section," which is a document pair having a predefined or alternatively, given attribute, were extracted as a similar document pair set 330 and 35 million document pairs each including arbitrary (e.g., random) two comments were extracted as a dissimilar document pair set 340, from among 140 million comments. Condition 1 is that, as a number of extractions of two comments increases infinitely, a probability α that two comments having the same attribute, or similar attributes, are semantically similar is greater than a probability β that arbitrarily (e.g., randomly) extracted two comments are semantically similar. Condition 2 is that, with the assumption that a value of a mathematical scale-based similarity (hereinafter, mathematical similarity) is the same or similar, a mathematical similarity between two comments having the same attribute, or similar attributes, is likely to be underestimated by the mathematical scale and a mathematical similarity between arbitrarily (e.g., randomly) estimated two comments is likely to be overestimated by the mathematical scale. The condition 1 and the condition 2 were verified by comparing comments for each mathematical similarity acquired through the experimental example. For example, a proportion of cases in which a semantic/subjective similarity is present between two comments having a relatively low mathematical similarity of 0.2 or less was higher. On the contrary, a proportion of cases in which a semantic/subjective similarity is absent between arbitrarily (e.g., randomly) extracted two comments having a relatively high mathematical similarity of 0.7 or more was higher.

Based on the above verification, the transfer learning system 300 according to some example embodiments may initially calculate a mathematical similarity using a mathematical scale for each similar document pair of the similar document pair set 330 and each dissimilar document pair of the dissimilar document pair set 340. The transfer learning system 300 may determine a semantic similarity for each of document pairs by increasing or decreasing the calculated mathematical similarity depending on whether the attributes are identical or similar. For example, a mathematical similarity calculated for each similar document pair of the similar document pair set 330 may be regarded to have (e.g., may be considered as indicating) an underestimated value for the mathematical similarity, and a semantic similarity may be calculated by appropriately increasing a value of the calculated mathematical similarity. On the contrary, a mathematical similarity calculated for each dissimilar document pair of the dissimilar document pair set 340 may be regarded to have (e.g., may be considered as indicating) an overestimated value for the mathematical similarity, and a semantic similarity may be calculated by appropriately decreasing a value of the calculated mathematical similarity.

As a further detailed example, the transfer learning system 300 may increase a value of a mathematical similarity of a similar document pair by inputting the value of the mathematical similarity of the similar document pair to a first nonlinear function (e.g., the aforementioned similarity upward function) and may decrease a value of a mathematical similarity of a dissimilar document pair by inputting the value of the mathematical similarity of the dissimilar document pair to a second nonlinear function (e.g., the aforementioned similarity downward function). The first nonlinear function may increase the value of the mathematical similarity underestimated for the similar document pair, and the second nonlinear function may decrease the value of the mathematical similarity overestimated for the dissimilar document pair. Any two nonlinear functions that meet a condition that the first nonlinear function calculates a higher value than the second nonlinear function with respect to all the same input values, or similar input values, may be used as the first nonlinear function and the second nonlinear function (e.g., the first nonlinear function may output a value greater than a value output by the second nonlinear function based on any value input to both the first nonlinear function and the second nonlinear function). According to some example embodiments, each of the first nonlinear function and/or the second nonlinear function may be designed, determined and/or selected through empirical study. According to some example embodiments, each of the increase level of the first nonlinear function and/or the decrease level of the second nonlinear function may be design parameters determined through empirical study.

A semantic similarity calculated for document pairs (e.g., using the first nonlinear function and the second nonlinear function) may be regarded as a correct answer similarity (or a target similarity) for the similarity model 320. For example, the transfer learning system 300 may train the similarity model 320 by using the similar document pair set 330, the dissimilar document pair set 340, and the correct answer similarity as learning data. For example, the similarity model 320 may be trained to calculate a semantic similarity for an input document pair.

In detail, for example, the similarity model 320 may be trained to minimize, or reduce, a mean squared error (MSE) between an output value (e.g., a semantic similarity determined using the similarity model 320) and a correct answer score (e.g., the calculated semantic similarity) with respect to input document pairs. For example, the similarity model 320 may be trained to minimize, or reduce, loss by inputting the output value and the correct answer score to a loss function using the MSE. At least one of known deep learning models may be used for the similarity model 320. For example, a convolutional neural network (CNN), a recurrent neural network (RNN), and/or the like may be used to implement the similarity model 320. In this case, the similarity model 320 may be configured to receive a document pair and to output a real number (a semantic similarity) with the range of 0 to 1. The range of an output value is provided as an example only and is not limited to the range of 0 to 1.

Figure 4:
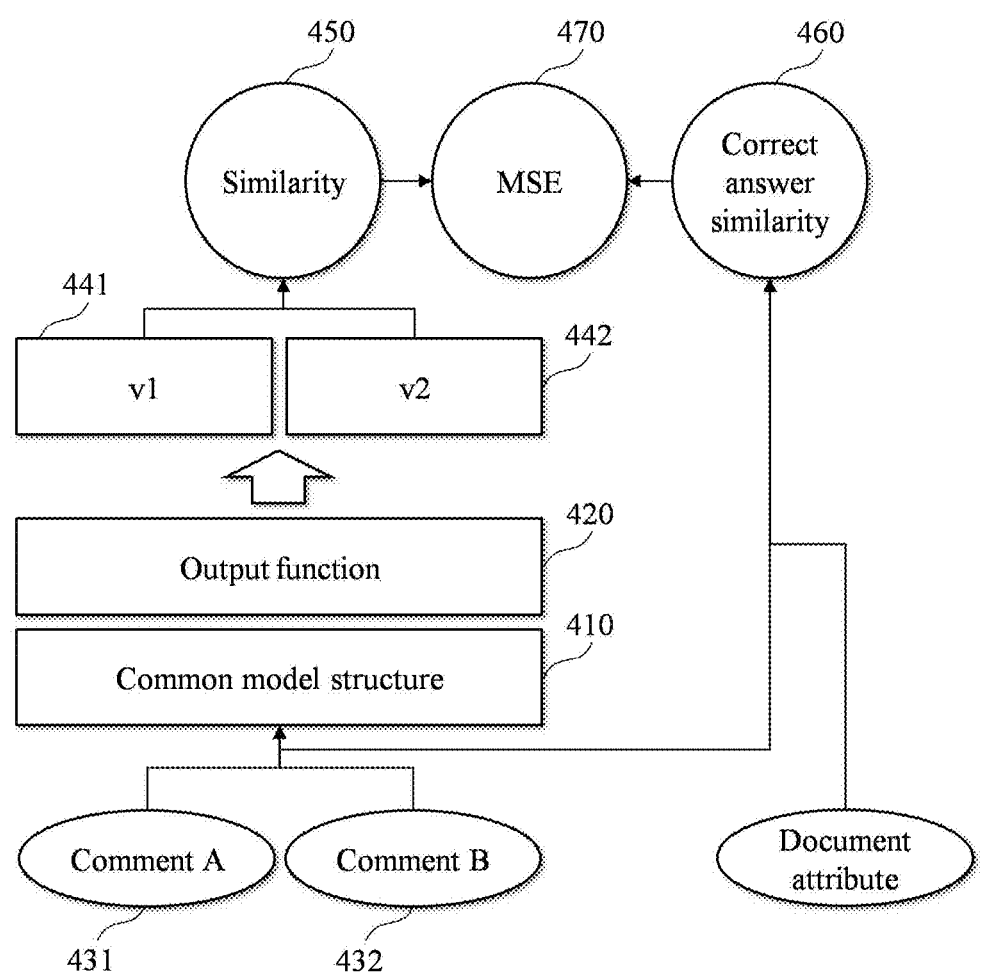
FIG. 4 illustrates an example of a learning process of a similarity model for pre-training according to some example embodiments.

FIG. 4 illustrates an example of a learning process of a similarity model for pre-training according to some example embodiments. The similarity model 320 of FIG. 3 may include a common model structure 410 and/or an output function 420. The common model structure 410 may have a form of a matrix for a feature learning and the output function 420 may be an operation of multiplying a matrix with a size of N×M to output an N-dimensional vector. The structure of the similarity model 320 may be easily understood through a deep learning model, such as, for example, a CNN, an RNN, and/or the like.

FIG. 4 illustrates an example in which, with respect to a comment A 431 and a comment B 432 as a document pair, the similarity model 320 outputs an N-dimensional vector v1 441, for the comment A 431, and an N-dimensional vector v2 442, for the comment B 432, and calculates a similarity 450 between the output N-dimensional vector v1 441 and N-dimensional vector v2 442. The similarity model 320 may be trained to output the similarity 450 that minimizes, or reduces, an MSE 470 between the similarity 450 and a correct answer similarity 460 acquired in advance for the comment A 431 and the comment B 432 (e.g., with regard to an attribute of the comment A 431 and the comment B 432).

The common model structure 410 of the trained similarity model 320 may be used for fine tuning.

Figure 5:
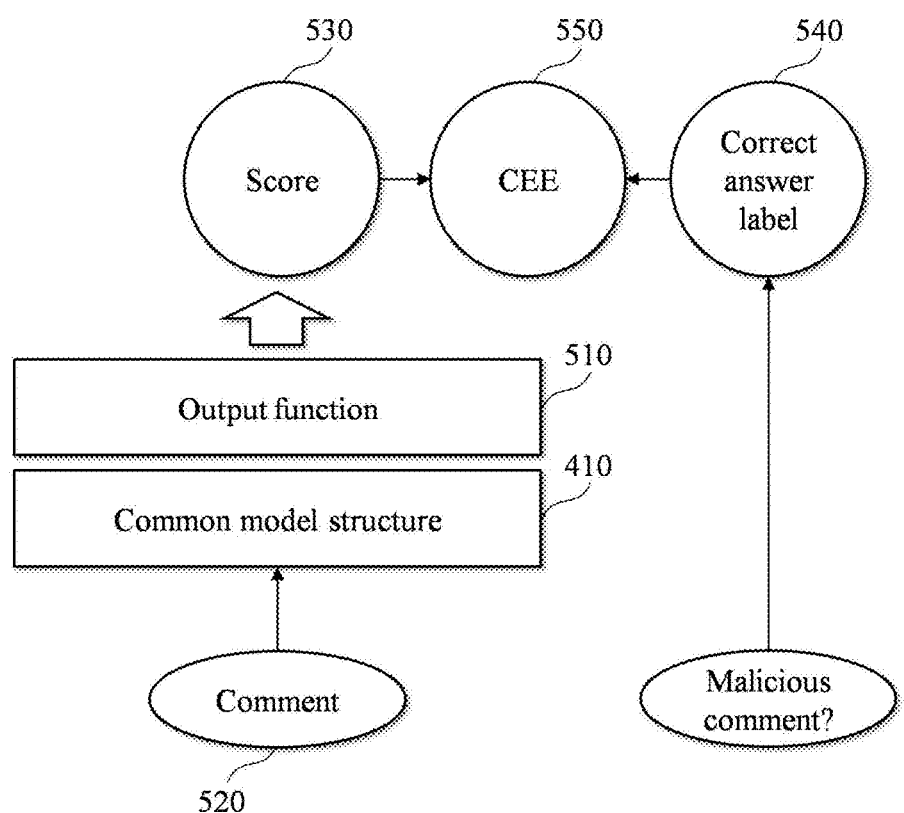
FIG. 5 illustrates an example of a learning process of a fine tuning model according to some example embodiments.

FIG. 5 illustrates an example of a learning process of a fine tuning model according to some example embodiments. The fine tuning model according to some example embodiments may include the trained common model structure 410 of FIG. 4 and an output function 510 for fine tuning.

As described above, the output function 420 for pre-training may be an operation of multiplying a matrix with a size of N×M to output an N-dimensional vector. For example, the output function 420 may be implemented as a 64D fully connected layer if N=64. The output function 420 may be replaced with another matrix with an appropriate size for fine tuning. For example, when training a K-binary classification model that calculates a probability value between 0 and 1 for each of K items for each document after pre-training, the output function 510 of the fine tuning model may be an operation of multiplying a matrix with a size of K×M to calculate a K-dimensional vector. For example, the output function 510 may be implemented as a 1D fully connected layer if K=1. A matrix of the output function 510 may be a new matrix that has not been pre-trained before and thus, may be randomly initialized using arbitrary values. As described above, transfer learning may be performed by training the fine tuning model using the common model structure 410 trained through pre-training and the replaced output function 510.

FIG. 5 illustrates an example of training the fine tuning model to output a score 530 for a comment 520 in fine tuning according to some example embodiments. The fine tuning model of FIG. 5 may be trained to output the score 530 (e.g., a final score output by the fine tuning model for the comment 520 after the training) that minimizes, or reduces, a cross entropy error (CEE) 550 between the score 530 (e.g., an initial score output by the fine tuning model for the comment 520) and a correct answer label 540. The correct answer label 540 may be predetermined or alternatively, given depending on whether the comment 520 is a malicious comment.

In a pre-training operation, various attributes may be used to constitute a similar document pair according to an aim of fine tuning. For example, when fine tuning aims to train a probability model regarding (e.g., to detect) whether a comment of an Internet community (that is one of types of documents) is a malicious comment, the presence of separate users that frequently write malicious comments may be assumed. If the fine tuning model is aware of (e.g., has access to) knowledge regarding whether authors of different comments are identical or similar, with the above assumption, the fine tuning model may enable an inference that an expression appearing in another similar comment, likely to be used (e.g., created) by the same author as, or a similar author to, that of a corresponding malicious comment, is likely to be a malicious comment in a process of classifying malicious comments. In this manner, the malicious comment detection performance of the fine tuning model may be improved. In addition, whether contents with comments are matched, a comment creation time, and/or a combination of such attributes may be used as a condition to construct a similar document pair based on a nature of an issue according to fine tuning to be solved herein.

Figure 6:
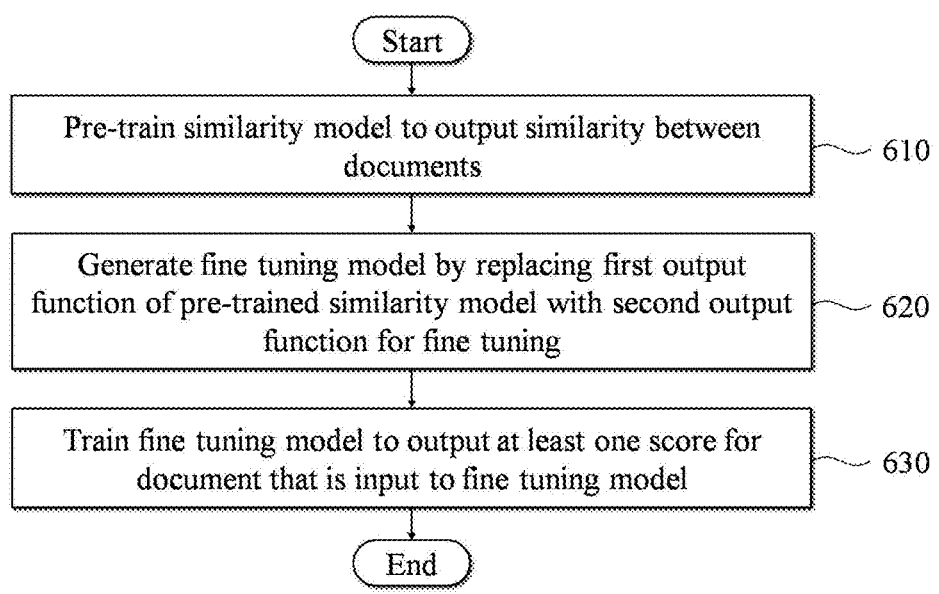
FIG. 6 is a flowchart illustrating an example of a transfer learning method according to some example embodiments.

FIG. 6 is a flowchart illustrating an example of a transfer learning method according to some example embodiments. The transfer learning method of FIG. 6 may be performed by the computer apparatus 200. The processor 220 of the computer apparatus 200 may be configured to execute a control instruction according to a code of at least one computer program, and/or a code of an OS, included in the memory 210. The processor 220 may control the computer apparatus 200 to perform operations 610 to 630 included in the transfer learning method of FIG. 6 in response to the control instruction provided from a code stored in the computer apparatus 200.

Referring to FIG. 6, in operation 610, the computer apparatus 200 may pre-train a similarity model to output a similarity between documents. For example, the computer apparatus 200 may extract, from a database, a similar document pair set that includes a plurality of similar document pairs having the same attribute, or similar attributes, and a dissimilar document pair set that includes a randomly extracted plurality of dissimilar document pairs. The attribute may include at least one of an author of a document, a posting section of the document, and/or a registration time range of the document. Knowledge of a similarity between documents according to such an attribute may be learned by the similarity model and may be transferred to a fine tuning model subsequently generated through the similarity model.

Initially, the computer apparatus 200 may acquire a semantic similarity for each of the plurality of similar document pairs and each of the plurality of dissimilar document pairs. To this end, the computer apparatus 200 may calculate a mathematical similarity using a mathematical scale for each of the plurality of similar document pairs and each of the plurality of dissimilar document pairs, and may calculate the semantic similarity for each of the plurality of similar document pairs and each of the plurality of dissimilar document pairs by increasing the mathematical similarity calculated for each of the plurality of similar document pairs and by decreasing the mathematical similarity calculated for each of the plurality of dissimilar document pairs. In detail, the computer apparatus 200 may increase the mathematical similarity calculated for each of the plurality of similar document pairs by inputting the same to a first nonlinear function and may decrease the mathematical similarity calculated for each of the plurality of dissimilar document pairs by inputting the same to a second nonlinear function. In this case, the first nonlinear function and the second nonlinear function may be two nonlinear functions that meet a condition that the first nonlinear function calculates a higher value than the second nonlinear function with respect to all the same input values or similar input values.

As described above, when the semantic similarity is calculated, the computer apparatus 200 may train the similarity model based on the plurality of similar document pairs, the plurality of dissimilar document pairs, and the semantic similarity. For example, the computer apparatus 200 may train the similarity model to minimize, or reduce, an MSE between an output value and a correct answer similarity with respect to input document pairs.

In operation 620, the computer apparatus 200 may generate the fine tuning model by replacing the first output function of the pre-trained similarity model with the second output function for fine tuning. The first output function may include an operation of multiplying a matrix with a size of N×M, and the second output function may include an operation of multiplying a matrix with a size of K×M. Each of N, M, and K denotes a natural number and N, M, and K may be different natural numbers since pre-training and fine tuning are learning for different purposes (e.g., to detect different features).

In operation 630, the computer apparatus 200 may train the fine tuning model to output at least one score for a document that is input to the fine tuning model. For example, the computer apparatus 200 may train a K-binary classification model that calculates a probability value for each of K items for each input document as the fine tuning model. K may denote a natural number. For example, in the case of training the fine tuning model to classify an input document into a corresponding item among a plurality of items, the K-binary classification model may be used. As another example, the computer apparatus 200 may train the fine tuning model to output a score that minimizes, or reduces, a CEE between a score of a corresponding input document and a correct answer label. The correct answer label may include a value, representing whether the input document is a malicious comment, that is predetermined or alternatively, given for the input document. In this case, the fine tuning model may be a malicious comment detection model that is trained to output information regarding whether the input document is a malicious comment as the score. The malicious comment detection model may be a K-binary classification model where K=1 and may output a score representing whether an input document belongs to a single item, for example, a malicious comment.

As described above, since the fine tuning model inherits the similarity model as a pre-training model, the fine tuning model may use knowledge of semantic attributes between documents learned by the similarity model. In addition, the similarity model as the pre-training model may extract a similar document pair and a dissimilar document pair from a database of documents depending on whether the same attribute is, or similar attributes are, included and may construct learning data. Therefore, data for pre-training may be obtained.

Figure 7:
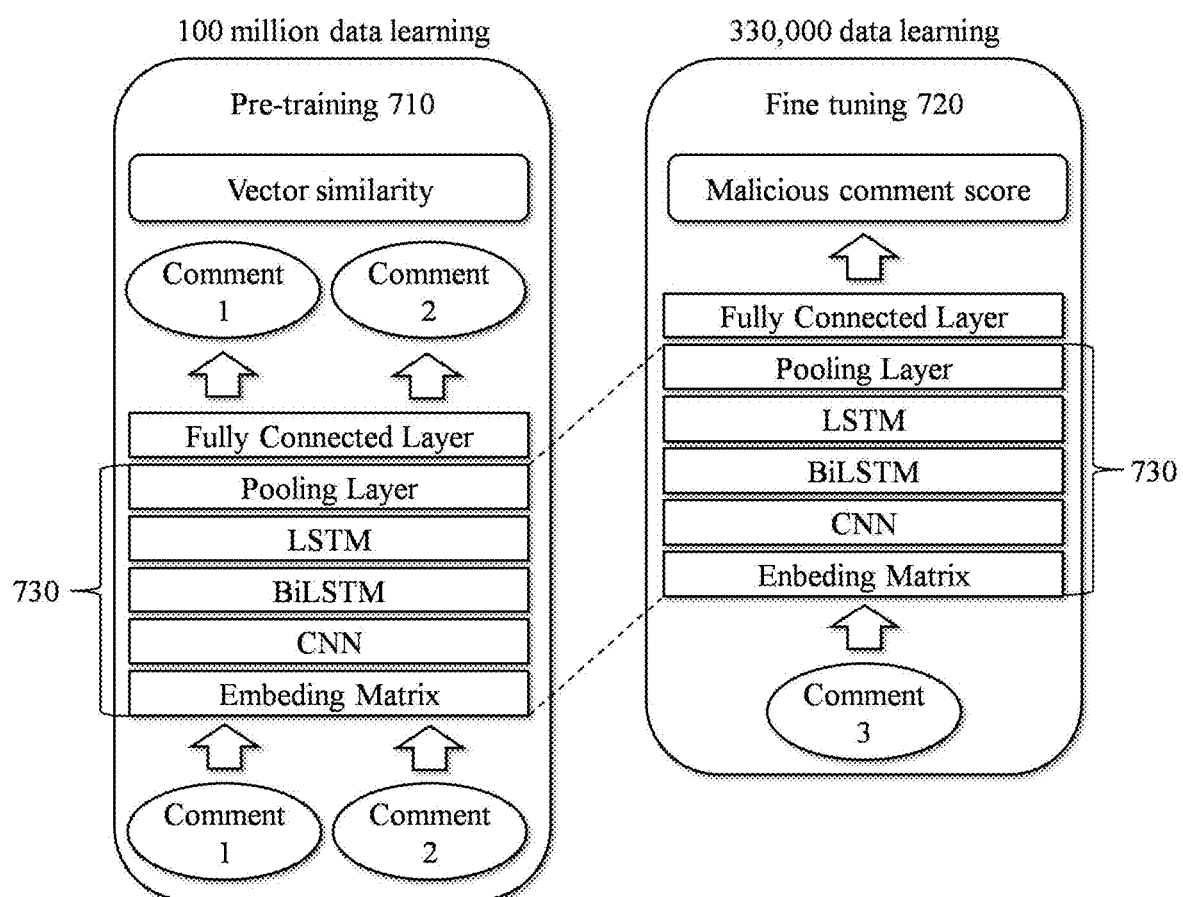
FIG. 7 illustrates an example of a malicious comment detection model according to some example embodiments.

FIG. 7 illustrates an example of a malicious comment detection model according to some example embodiments.

FIG. 7 illustrates a pre-training process 710 using a similarity model that has learned 100 million data (e.g., performed 100 million learning iterations using comments as input) for comments and a fine tuning process 720 using a fine tuning model that has learned 330,000 data (e.g., performed 330,000 learning iterations using comments as input) for comments. The fine tuning model may inherit a common model structure 730 of the similarity model. Accordingly, the pre-training process 710 may create learning data depending on whether comments of the database have the same attribute or similar attributes, and thus, may learn a relatively large amount of data. According to some example embodiments, the similarity model may be pre-trained according to learning data from a field (e.g., document similarity), and the fine tuning model may incorporate the common model structure 730 from the similarity model and may be further trained according to learning data from a different field (e.g., malicious comment detection).

Therefore, the fine tuning process 720 may inherit the common model structure 730 of the similarity model trained through the pre-training process 710 and may additionally learn learning data created for the malicious comment detection. In this manner, the malicious comment detection performance may be significantly improved. In the fine tuning process 720, the fine tuning model may be generated by replacing an output function (a fully connected layer) of the similarity model with an output function for fine tuning. The common model structure 730 includes an embedding matrix, a CNN, a long short term memory (LSTM), a bidirectional LSTM (BiLSTM), and/or a pooling layer as a structure used for an actual experimental example. However, it is provided as an example only. Each of components may be easily understood through the known art for a deep learning model. According to some example embodiments, the transfer learning system 300 may block registration of a new document (e.g., a comment), and/or block access to a user that submitted the new document, in response to detecting that the new document is a malicious comment (e.g., based on the score output by the fine tuning model). Blocking registration of the new document may include preventing or reducing display of the new document. Blocking access to the user may include eliminating, or reducing, a privilege of the user to submit documents (e.g., comments), view documents and/or access a system providing a platform for document submission. According to some example embodiments, the transfer learning system 300 may register and/or display the new document (e.g., the comment) in response to detecting that the new document is not a malicious comment. For example, a system providing a social media service may include the transfer learning system 300.

Conventional devices for building a machine learning model train the model using learning data from a field corresponding to the model. Accordingly, especially in circumstances in which learning data is insufficient in the corresponding field, the model trained by the conventional devices is incomplete. Thus, the conventional devices fail to provide a machine learning model capable of higher-precision processing, especially in circumstances in which learning data is insufficient in the corresponding field.

However, according to some example embodiments, improved devices for building a machine learning model are provided. For example, the improved devices may generate a machine learning model by incorporating at least a portion of a different, pre-trained machine learning model, and further training the machine learning model. Accordingly, the improved devices overcome the deficiencies of the conventional devices to provide a machine learning model capable of higher-precision processing, even in circumstances in which learning data is insufficient in a field corresponding to the model.

In some example embodiments, the transfer learning system 300 (e.g., the processor 220) may perform some operations (e.g., the operations described herein as being performed training, using and/or implementing the similarity model 320, the common model structure 410, the output function 420, the pre-training model, the fine tuning model, the output function 510, the K-binary classification model, the malicious comment detection model and/or the common model structure 730) by artificial intelligence and/or machine learning. As an example, the transfer learning system 300 (e.g., the processor 220) may implemented an artificial neural network (e.g., the similarity model 320, the common model structure 410, the output function 420, the pre-training model, the fine tuning model, the output function 510, the K-binary classification model, the malicious comment detection model and/or the common model structure 730) that is trained on a set of training data by, for example, a supervised, unsupervised, and/or reinforcement learning model, and wherein the transfer learning system 300 (e.g., the processor 220) may process a feature vector to provide output based upon the training. Such artificial neural networks may utilize a variety of artificial neural network organizational and processing models, such as CNNs, RNNs optionally including long short-term memory (LSTM) units and/or gated recurrent units (GRU), stacking-based deep neural networks (S-DNN), state-space dynamic neural networks (S-SDNN), deconvolution networks, deep belief networks (DBN), and/or restricted Boltzmann machines (RBM). Alternatively or additionally, the transfer learning system 300 (e.g., the processor 220) may include other forms of artificial intelligence and/or machine learning, such as, for example, linear and/or logistic regression, statistical clustering, Bayesian classification, decision trees, dimensionality reduction such as principal component analysis, and expert systems; and/or combinations thereof, including ensembles such as random forests.

The systems or the apparatuses described above may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will appreciate that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The above-described methods according to some example embodiments may be configured in a form of program instructions performed through various computer devices and recorded in non-transitory computer-readable media. The media may also include, alone or in combination with the program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by an app store that distributes applications or a site, a server, and the like that supplies and distributes other various types of software. Examples of a program instruction may include a machine language code produced by a compiler and a high-language code executable by a computer using an interpreter.

While this disclosure includes some example embodiments, it will be apparent to one of ordinary skill in the art that various alterations and modifications in form and details may be made without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A transfer learning method of a computer apparatus comprising at least one processor, the transfer learning method comprising:

extracting, by the at least one processor, a similar document pair set and a dissimilar document pair set from a document database, the similar document pair set including a plurality of similar document pairs having a common attribute, and the dissimilar document pair set including a plurality of dissimilar document pairs extracted randomly;

acquiring, by the at least one processor, a semantic similarity for each of the plurality of similar document pairs and each of the plurality of dissimilar document pairs by initially determining a calculated mathematical similarity depending on whether attributes of each of the plurality of similar document pairs and each of the plurality of dissimilar document pairs are identical or similar;

adjusting the calculated mathematical similarity by increasing the calculated mathematical similarity for each similar document pair of the similar document pair set and by decreasing the calculated mathematical similarity for each dissimilar document pair of the dissimilar document pair set;

pre-training, by the at least one processor, a similarity model using the plurality of similar document pairs, the plurality of dissimilar document pairs, and the semantic similarity to output a similarity between documents;

generating, by the at least one processor, a fine tuning model by replacing a first output function of the pre-trained similarity model with a second output function; and training, by the at least one processor, the fine tuning model to output a score for a document input to the fine tuning model.

2. The transfer learning method of claim 1, wherein
the first output function includes an operation of multiplying a matrix with a size of N×M;
the second output function includes an operation of multiplying a matrix with a size of K×M; and
each of N, M, and K denotes a natural number.

3. The transfer learning method of claim 1, wherein
the fine tuning model is a K-binary classification model;
the score is a probability value for each of K items corresponding to the document; and
K denotes a natural number.

4. The transfer learning method of claim 1, wherein the training comprises:
training the fine tuning model to output the score that minimizes a cross entropy error (CEE) between a corresponding score of the document and a correct answer label.

5. The transfer learning method of claim 4, wherein
the correct answer label comprises a value representing whether the document is a malicious comment;
the fine tuning model is a malicious comment detection model; and
the score represents whether the document is a malicious comment.

6. The transfer learning method of claim 1, wherein the acquiring comprises:
calculating, by the at least one processor, the calculated mathematical similarity for each of the plurality of similar document pairs and each of the plurality of dissimilar document pairs using a mathematical scale to obtain a first plurality of mathematical similarities based on the plurality of similar document pairs and a second plurality of mathematical similarities based on the plurality of dissimilar document pairs, and
calculating, by the at least one processor, the semantic similarity for each of the plurality of similar document pairs and each of the plurality of dissimilar document pairs to obtain a first plurality of semantic similarities based on the plurality of similar document pairs and a second plurality of semantic similarities based on the plurality of dissimilar document pairs, each of the first plurality of semantic similarities being higher than a corresponding one of the first plurality of mathematical similarities, and each of the second plurality of semantic similarities being lower than a corresponding one of the second plurality of mathematical similarities; and
the training the similarity model trains the similarity model using the plurality of similar document pairs, the plurality of dissimilar document pairs, the first plurality of semantic similarities and the second plurality of semantic similarities.

7. The transfer learning method of claim 6, wherein
the calculating the semantic similarity comprises:
calculating the first plurality of semantic similarities by inputting the first plurality of mathematical similarities to a first nonlinear function, and
calculating the second plurality of semantic similarities by inputting the second plurality of mathematical similarities to a second nonlinear function; and
the first nonlinear function outputs a higher value than a value output by the second nonlinear function based on any value input to both the first nonlinear function and the second nonlinear function.

8. The transfer learning method of claim 1, wherein the common attribute comprises at least one of an author of a respective document, a posting section of the respective document, or a registration time range of the respective document.

9. A non-transitory computer-readable record medium storing instructions that, when executed by at least one processor, cause the at least one processor to perform the transfer learning method of claim 1.

10. A computer apparatus comprising:
at least one processor configured to execute computer-readable instructions, the at least one processor being configured to cause the computer apparatus to,
extract a similar document pair set and a dissimilar document pair set from a document database, the similar document pair set including a plurality of similar document pairs having a common attribute, and the dissimilar document pair set including a plurality of dissimilar document pairs extracted randomly,
acquire a semantic similarity for each of the plurality of similar document pairs and each of the plurality of dissimilar document pairs by initially determining a calculated mathematical similarity depending on whether attributes of each of the plurality of similar document pairs and each of the plurality of dissimilar document pairs are identical or similar,
adjust the calculated mathematical similarity by increasing the calculated mathematical similarity for each similar document pair of the similar document pair set and by decreasing the calculated mathematical similarity for each dissimilar document pair of the dissimilar document pair set;
pre-train a similarity model using the plurality of similar document pairs, the plurality of dissimilar document pairs, and the semantic similarity to output a similarity between documents,
generate a fine tuning model by replacing a first output function of the pre-trained similarity model with a second output function, and
train the fine tuning model to output a score for a document input to the fine tuning model.

11. The computer apparatus of claim 10, wherein
the first output function includes an operation of multiplying a matrix with a size of N×M;
the second output function includes an operation of multiplying a matrix with a size of K×M; and
each of N, M, and K denotes a natural number.

12. The computer apparatus of claim 10, wherein
the fine tuning model is a K-binary classification model;
the score is a probability value for each of K items corresponding to the document; and
K denotes a natural number.

13. The computer apparatus of claim 10, wherein the at least one processor is configured to cause the computer apparatus to:
  train the fine tuning model to output the score that minimizes a cross entropy error (CEE) between a corresponding score of the document and a correct answer label.

14. The computer apparatus of claim 10, wherein the at least one processor is configured to cause the computer apparatus to:
  calculate the calculated mathematical similarity for each of the plurality of similar document pairs and each of the plurality of dissimilar document pairs using a mathematical scale to obtain a first plurality of mathematical similarities based on the plurality of similar document pairs and a second plurality of mathematical similarities based on the plurality of dissimilar document pairs;
  calculate the semantic similarity for each of the plurality of similar document pairs and each of the plurality of dissimilar document pairs to obtain a first plurality of semantic similarities based on the plurality of similar document pairs and a second plurality of semantic similarities based on the plurality of dissimilar document pairs, each of the first plurality of semantic similarities being higher than a corresponding one of the first plurality of mathematical similarities, and each of the second plurality of semantic similarities being lower than a corresponding one of the second plurality of mathematical similarities; and
  train the similarity model using the plurality of similar document pairs, the plurality of dissimilar document pairs, the first plurality of semantic similarities and the second plurality of semantic similarities.

15. The computer apparatus of claim 14, wherein
  the at least one processor is configured to cause the computer apparatus to,
    calculate the first plurality of semantic similarities by inputting the first plurality of mathematical similarities to a first nonlinear function, and
    calculate the second plurality of semantic similarities by inputting the second plurality of mathematical similarities to a second nonlinear function; and
  the first nonlinear function outputs a higher value than a value output by the second nonlinear function based on any value input to both the first nonlinear function and the second nonlinear function.

16. The computer apparatus of claim 10, wherein the common attribute comprises at least one of an author of a respective document, a posting section of the respective document, or a registration time range of the respective document.

17. The transfer learning method of claim 1, further comprising:
  obtaining, by the at least one processor, another score of another document input to the trained fine tuning model; and
  preventing, by the at least one processor, display of the another document in response to detecting that the another document includes a malicious comment based on the another score.

18. The computer apparatus of claim 10, wherein the at least one processor is configured to cause the computer apparatus to:
  obtain another score of another document input to the trained fine tuning model; and
  prevent display of the another document in response to detecting that the another document includes a malicious comment based on the another score.

* * * * *